UNITED STATES PATENT OFFICE.

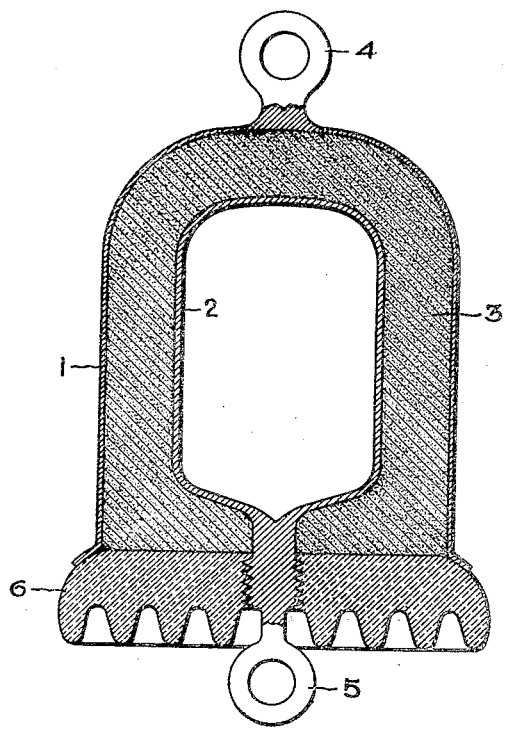

ERNST F. W. ALEXANDERSON, OF SCHENECTADY, NEW YORK, ASSIGNOR TO GENERAL ELECTRIC COMPANY, A CORPORATION OF NEW YORK.

CONDENSER.

1,266,377. Specification of Letters Patent. Patented May 14, 1918.

Application filed November 26, 1915. Serial No. 63,437.

*To all whom it may concern:*

Be it known that I, ERNST F. W. ALEXANDERSON, a citizen of the United States, residing at Schenectady, in the county of Schenectady, State of New York, have invented certain new and useful Improvements in Condensers, of which the following is a specification.

My present invention relates to condensers and more especially to condensers which may be used for the protection of distribution systems.

The object of my invention is to provide a condenser having a dielectric composed of material having high dielectric hysteresis losses when high frequency potentials are impressed upon the condenser. A further object of my invention is to provide such a condenser in a form which will be suitable for the protection of an electrical transmission system.

The use of capacity in series with resistance between a transmission line and ground or between the conductors thereof has been proposed for protecting the system from the effect of high frequency disturbances. With such an arrangement the protective path offers a high impedance to current of normal frequency but a much lower impedance to any high frequency disturbances which may occur in the system. As a result there will be a flow of high frequency energy through the resistance and a large part of this energy will be dissipated in the resistance. The power factor of a leakage circuit of this kind however varies widely with the frequency and with ordinary condensers is normally low. As a means of absorbing high frequency energy such a circuit is most efficient at some particular frequency which depends upon the relation between the capacity and resistance and for frequencies higher or lower than this particular frequency is less efficient. A further object of my invention is to provide a protective means for transmission systems, the power factor of which is normally high and varies but little with the frequency. Still another object of my invention is to provide a means for dissipating high frequency energy in which the energy dissipated increases directly with the frequency throughout the entire range of its operation.

My invention will best be understood by reference to the following description taken in connection with the accompanying drawing in which I have shown a sectional view of one form which my invention may take. As here indicated my condenser comprises an outer electrode 1 of any suitable conductive material and an inner electrode 2 which may also be of any desired conductive material, the space between the two electrodes being filled with an insulating material 3 having a high dielectric hysteresis such for example as asbestos or a compound consisting largely of asbestos. The electrodes are provided with eyes 4 and 5 for convenience in connecting the device to a transmission line. A skirt 6 of porcelain or other suitable insulating material may be provided to prevent arcing over between the electrodes. A condenser of this type may be connected between a transmission line conductor and ground or between conductors in different phases. If desired it may be connected between the transmission line and a secondary conductor having a high capacity to ground so that a breakdown in the protective device will not cause a breakdown in the line insulation. A protective device of this type should be designed with small capacity so that it will have a high impedance for currents of low frequency, but much lower impedance for high frequency currents.

I have discovered that the dielectric hysteresis losses of asbestos are much higher than those of materials such as glass, paper and mica, which are ordinarily used for the dielectric medium of condensers and that these losses increase very rapidly with the frequency.

The power factor of a condenser having asbestos as a dielectric is also much higher than that of ordinary condensers. For example, the power factor of an asbestos condenser at 20,000 cycles was found to be about 38% while the power factor of similar glass, paper and mica condensers at that frequency was 2% or less. With a frequency of 70,000 cycles the power factor of the asbestos condenser was over 30% and that of the paper, glass and mica condensers was about the same as at the lower frequency.

While I have illustrated and described but one form of my invention it will be apparent that many modifications in the form thereof as well as in its application may be made without departing from the scope of the appended claims.

What I claim as new and desire to secure by Letters Patent of the United States, is:—

1. A condenser having a dielectric composed in part at least of asbestos.

2. A condenser having a dielectric of asbestos.

3. A protective device for electrical transmission systems comprising a condenser having a dielectric of asbestos.

4. Means for dissipating the energy of high frequency disturbances in an electrical transmission system comprising a condenser having a dielectric of asbestos.

5. Protective means for an electrical distribution system comprising a device having two conducting surfaces separated by a dielectric and adapted to be placed in shunt between conductors of the system, the dielectric being of such a nature that when the device is so placed it will have a power factor of over 20% at all frequencies, the impedance of said device varying substantially inversely with the frequency, and the power factor being substantially independent of the frequency.

6. A protective device for electrical distribution systems comprising a hollow outer electrode, an inner electrode having a surface substantially parallel with the inner surface of the outer electrode, and spaced apart therefrom, the space between the electrodes being filled with asbestos, and means upon each electrode for connecting it to the distribution system.

In witness whereof I have hereunto set my hand this 24th day of November, 1915.

ERNST F. W. ALEXANDERSON.

Copies of this patent may be obtained for five cents each, by addressing the "Commissioner of Patents, Washington, D. C."